United States Patent [19]

Hanson

[11] 4,068,898
[45] Jan. 17, 1978

[54] WHEEL-BALANCING WEIGHT HAVING RECORDING SURFACE

[76] Inventor: Donald E. Hanson, 986 Crane Ave., Foster City, Calif. 94404

[21] Appl. No.: 651,576

[22] Filed: Jan. 22, 1976

[51] Int. Cl.² .............................................. B60B 27/00
[52] U.S. Cl. ....................................... 301/5 B; 40/616; 40/587
[58] Field of Search .................... 301/5 B; 74/573; 16/DIG. 8; 428/40, 41, 351, 352; 40/136, 135, 129 B

[56] References Cited

U.S. PATENT DOCUMENTS

| 2,714,039 | 7/1955 | Powell | 301/5 B |
| 3,868,293 | 2/1975 | Selph | 428/40 |

FOREIGN PATENT DOCUMENTS

| 1,394,555 | 2/1965 | France | 40/615 |
| 542,255 | 8/1922 | France | 40/587 |

OTHER PUBLICATIONS

American Racing Equipment, Centrifugal Lock Balancing Weights, Nov. 15, 1963, all pages included.

Primary Examiner—Robert B. Reeves
Assistant Examiner—H. Grant Skaggs
Attorney, Agent, or Firm—C. Michael Zimmeman

[57] ABSTRACT

A metallic weight used for balancing tires on wheel rims of motor vehicles configured in such a manner as to allow the recording thereon of the mileage and other pertinent data of the motor vehicle at the time the weight is installed on the wheel rim.

2 Claims, 6 Drawing Figures

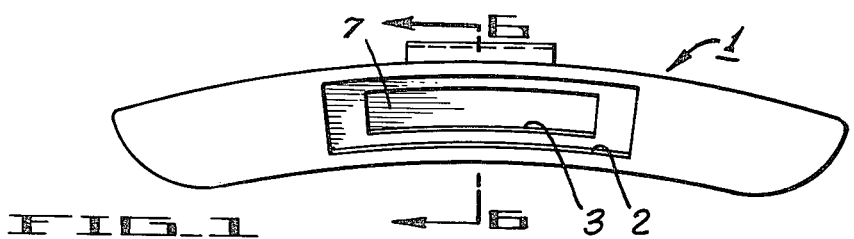
FIG_1
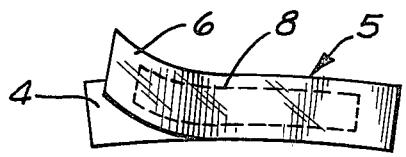
FIG_2
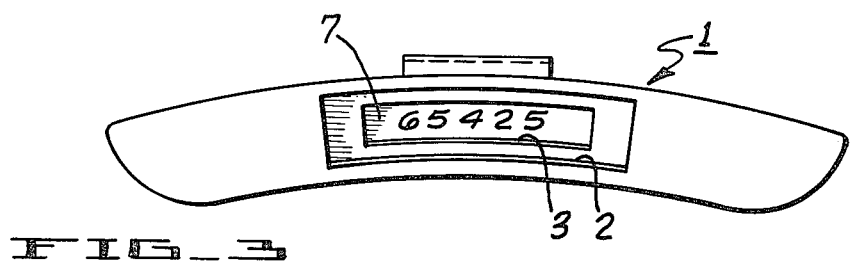
FIG_3
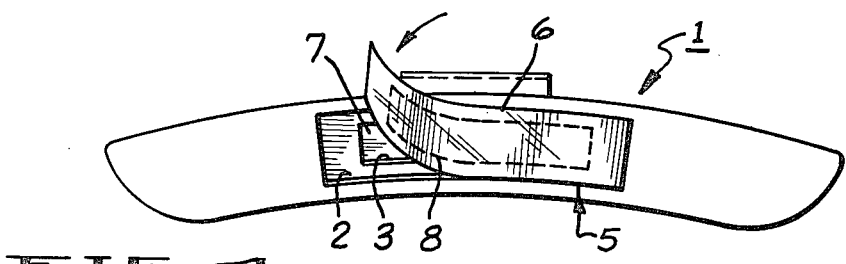
FIG_4
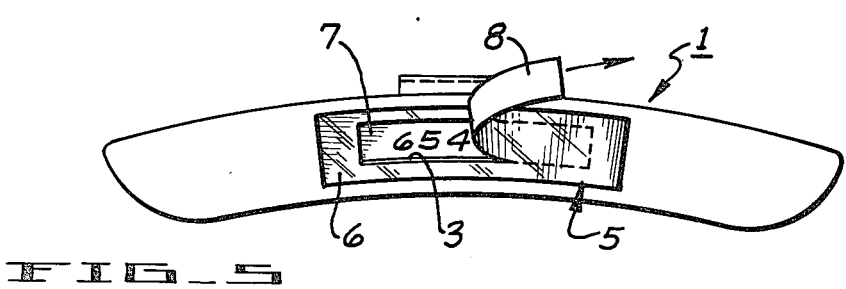
FIG_5
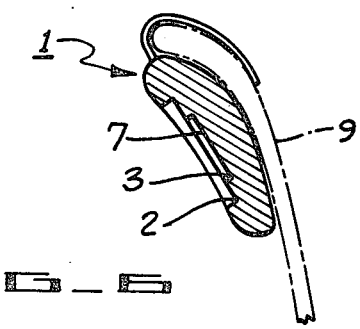
FIG_6

WHEEL-BALANCING WEIGHT HAVING RECORDING SURFACE

BACKGROUND OF INVENTION

It is a common practice when mounting tires on wheel rims of motor vehicles to balance the tires and rims by attaching metallic weights of various sizes to the wheel rims.

It is desirable from the standpoint of owners and operators of motor vehicles, especially commercial vehicles, to maintain records of the performance and mileage obtained from various kinds of tires.

The present invention provides a means wereby owners and operators of motor vehicles can readily record the mileage and other data pertaining to such vehicles on the wheel rim weight at the time the tire is mounted. The present invention further provides a means of preserving such pertinent data with the tire until the tire is replaced at which time the data can be extracted and utilized by the owner or operator to evaluate the performance and mileage obtained by the tire which was mounted on the rim.

SUMMARY OF INVENTION

In its basic aspects, the invention comprises a vehicle wheel-balancing weight have a recording surface adapted to receive at the time a tire is installed on a vehicle data relative to the state of the vehicle at such time; means on the weight for adhering the same to a vehicle wheel; and means to cover the recording surface on the weight to preserve any data which has been placed on the same.

In specific detail, the invention comprises a wheel balancing weight with two symmetrical rectangular indentations cast into it and an adhesive tape which is affixed to the weight on the ridge formed by the different sizes of the rectangular indentations. The adhesive tape is approximately the same length and width as the outermost indentation, being shorter in length and width by an amount necessary to allow clearance when affixing the tape to the weight. The interior rectangular area of the tape is designed to allow it to be easily separated from the remainder of the tape so that the data recorded on the innermost indentation may be read. The surface of the innermost indentation is covered with a material which is impervious to the weather, and which allows the data to be inscribed thereon with an indelible pen or pencil.

DESCRIPTION OF FIGURES

The present invention is illustrated with respect to preferred embodiments thereof in the accompanying drawings wherein:

FIG. 1 is an illustration of a preferred embodiment of a vehicle wheel-balancing weight of the invention.

FIG. 2 is an illustration of a weather-proof adhesive tape designed to allow it to be removed from a protective backing and affixed to the wheel-balancing weight shown in FIG. 1.

FIG. 3 is an illustration of the preferred embodiment of the wheel-balancing weight of the invention having the mileage of a hypothetical vehicle recorded thereon.

FIG. 4 is an illustration of the preferred embodiment of the wheel-balancing weight of the invention with the adhesive tape removed from its protective backing and affixed to the weight, except for the left end which is raised for the purpose of illustrating the application of the tape to the weight.

FIG. 5 is an illustration of the tape with the central rectangular portion removed to allow reading of the original recorded mileage.

FIG. 6 is an enlarged fragmentary sectional view of the weight taken along lines 6—6 of FIG. 1.

DESCRIPTION OF PREFERRED EMBODIMENTS

Referring first to FIG. 1 there will be seen to be illustrated a vehicle wheel-balancing weight 1 with an outermost rectangular indentation 2 cast into it and an innermost indentation 3 cast into the weight symetrically about the axes of the outermost indentation.

At the bottom of the innermost indentation 3 there is located a weather-proof recording surface 7 which will allow the inscription of letters, numerals or other indicia from an indelible pen or pencil. The weather-proof surface is selected to legibly preserve the data inscribed thereon notwithstanding immersion in water, exposure to heat or cold or other adverse environmental or operating conditions.

Means are provided for covering the recording surface 7 to preserve data entered onto the same. That is, a flexible adhesive weather-proof tape 5 with backing consisting of the flexible adhesive tape 6, a protective backing 4 and a removable center section 8 is provided for affixing to the weight to provide a weather-proof cover for the data inscribed on surface 7 and to allow removal of a portion thereof for reading the data at the desired time.

Referring next to FIG. 3, there will be seen to be illustrated the same wheel-balancing weight 1 with the desired data inscribed upon the weather-proof surface 7.

Referring next to FIG. 4, there will be seen to be illustrated the same wheel-balancing weight 1 with the flexible adhesive tape 6 partially applied thereto. As can be seen from the drawing, the flexible tape fits within the outermost rectangular indentation 2 and is adhered to the shelf it defines surrounding the innermost indentation. There can be seen on tape 6 the central rectangular portion 8 of the flexible adhesive tape designed to provide a weather-proof covering for surface 7, but also to allow it to be readily removed at the desired time to read the data inscribed on surface 7. The protective backing 4 has been removed from the flexible adhesive tape and discarded.

Referring next to FIG. 5, there will be seen to be illustrated the same wheel-balancing weight with flexible adhesive tape 6 in place, but with removable center section 8 partially removed. It should be noted that when center section 8 is in place, it is spaced above the recording surface defined by the base of the innermost indentation. Moreover, it is not necessary that such center section include adhesive and, preferably, has none.

Referring finally to FIG. 6, there will be seen to be an enlarged fragmentary sectional view of weight 1 taken along lines 6—6 of FIG. 1 depicting the innermost indentation 3, outermost indentation 2 and weather-proof surface 7. The weight of FIG. 6 is depicted as adhered by means in the form of a clip to a wheel rim 9 shown in phantom lines.

This invention allows an owner or operator of a motor vehicle, including owners or operators of commercial motor vehicles to record on the wheel-balancing weight 1 the state of the vehicle, e.g., its mileage or other desired pertinent data on the wheel-balancing weight 1 at the time a tire is installed on the rim. For example, when a tire and wheel-balancing weight is installed on a wheel rim at the same time, the mileage inscribed on surface 7 will record the beginning mileage of the tire. Other pertinent vehicle data inscribed on surface 7 might include, but not be limited to, the date, identification of the vehicle, the position of the tire, and the brand of the tire.

When the tire is replaced due to failure or periodic maintenance, the wheel-balancing weight is removed from the wheel rim at the same time as the tire. At this time, the removable central section 8 of tape 6 which is coterminus with the innermost indentation 3, is removed and the data inscribed on weather-proof surface 7 is transmitted along with other desired data, such as the mileage of the vehicle at the time of the weight removal, to a central location to allow the owner or operator of the motor vehicle to evaluate the performance and mileage obtained from various brands of tires or from various different kinds of operations of motor vehicles.

The invention vastly simplifies record keeping of tire performance for owners and operators of large fleet motor vehicle operations and does not require the final, central recording of tire data until all of the data pertaining to that tire is known, that is, at the end of the tire's life cycle. The invention is useful as well for keeping records of tire performance for individually-owned private motor vehicles.

Although the present invention has been described with respect to a particular preferred embodiment thereof, it is believed evident that the actual physical configuration of the weight and tape illustrated in FIGS. 1 and 2 may be modified to conform to selected weight design considerations. Reference is thus made to the appended claims for a precise delineation of the scope of this invention.

I claim:

1. A vehicle wheel-balance weight with a rectangular indentation having a base defining a recording surface; data on said recording surface setting forth the state of the vehicle at the time a tire is installed on said vehicle; means on said weight for adhering the same to said vehicle wheel; an adhesive tape to cover said recording surface to preserve data on the same during use of said wheel to which said weight is adhered; and a recess peripherally surrounding said indentation to define a shelf to which said tape is securable spaced above said recording surface.

2. A vehicle wheel-balaancing weight with a rectangular indentation having a base defining a recording surface; data on said recording surface setting forth the state of the vehicle at the time a tire is installed on said vehicle; means on said weight for adhering the same to said vehicle wheel; and an adhesive tape to cover said recording surface to preserve data on the same during use of said wheel to which said weight is adhered, said adhesive tape including a central portion substantially coterminus with said rectangular indentation which is removable from the remainder of said tape to expose said recording surface.

* * * * *